US012519234B2

(12) United States Patent
Rush et al.

(10) Patent No.: US 12,519,234 B2

(45) Date of Patent: Jan. 6, 2026

(54) ULTRA-WIDEBAND ANTENNA ASSEMBLY

(71) Applicant: Apple Inc., Cupertino, CA (US)

(72) Inventors: Alden T Rush, San Diego, CA (US); Han Wang, Campbell, CA (US); Jingni Zhong, Santa Clara, CA (US); Ming Chen, Cupertino, CA (US); Yiren Wang, Cupertino, CA (US); Yuan Tao, Santa Clara, CA (US); Hao Xu, Cupertino, CA (US); Hongfei Hu, Cupertino, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 167 days.

(21) Appl. No.: 18/458,916

(22) Filed: Aug. 30, 2023

(65) Prior Publication Data

US 2024/0079782 A1 Mar. 7, 2024

Related U.S. Application Data

(60) Provisional application No. 63/403,613, filed on Sep. 2, 2022.

(51) Int. Cl.
*H01Q 7/00* (2006.01)
*H01Q 1/38* (2006.01)
(Continued)

(52) U.S. Cl.
CPC ................. *H01Q 7/00* (2013.01); *H01Q 1/38* (2013.01); *H01Q 1/48* (2013.01)

(58) Field of Classification Search
CPC ........... H01Q 1/243; H01Q 1/38; H01Q 1/48; H01Q 9/0485; H01Q 9/42; H01Q 1/273; H01Q 21/28; H01Q 1/2258; H01Q 9/0407; H01Q 1/422; H01Q 1/50; H01Q 5/371; H01Q 1/241
See application file for complete search history.

(56) References Cited

U.S. PATENT DOCUMENTS 10,243,624 B2 3/2019 Kim et al.
10,741,906 B2 8/2020 Gomez Angulo et al.
(Continued)

OTHER PUBLICATIONS

U.S. Appl. No. 17/867,504, filed Jul. 18, 2022.
U.S. Appl. No. 17/849,501, filed Jun. 24, 2022.

*Primary Examiner* — Wei (Victor) Y Chan
(74) *Attorney, Agent, or Firm* — Treyz Law Group, P.C.; Michael H. Lyons

(57) ABSTRACT

An electronic device may be provided with a housing and an antenna. The antenna may be on a first substrate mounted to a second substrate. The housing may include a dielectric cover, a conductive plate on the dielectric cover, and a mid-chassis. The second substrate may be mounted to the mid-chassis. The antenna may include a conductive patch extending from a segment of a conductive ring on the first substrate. The conductive plate may have an opening aligned with the conductive patch. The first substrate may be separated from the dielectric cover by an air gap. A conductive gasket may couple the conductive ring to the conductive plate and may laterally surround the air gap and the opening. The antenna may convey ultra-wideband (UWB) signals through the air gap, the opening, and the dielectric cover layer.

20 Claims, 10 Drawing Sheets

(51) Int. Cl.

| | |
|---|---|
| ***H01Q 1/48*** | (2006.01) |
| ***H01Q 9/42*** | (2006.01) |

(56) References Cited

U.S. PATENT DOCUMENTS

| | | | | |
|---|---|---|---|---|
| 10,903,566 | B2 | 1/2021 | Di Nallo et al. | |
| 10,957,978 | B2 | 3/2021 | Cooper et al. | |
| 11,114,748 | B2 | 9/2021 | Yarga et al. | |
| 11,239,550 | B2 | 2/2022 | Cooper et al. | |
| 11,424,539 | B2 | 8/2022 | Alpman et al. | |
| 2020/0227821 | A1* | 7/2020 | Wu | H01Q 1/38 |
| 2021/0096515 | A1* | 4/2021 | Ruaro | G04G 21/04 |
| 2021/0328334 | A1* | 10/2021 | Cooper | H01Q 5/35 |
| 2023/0084310 | A1 | 3/2023 | Cooper et al. | |

* cited by examiner

ULTRA-WIDEBAND ANTENNA ASSEMBLY

This application claims the benefit of U.S. Provisional Patent Application No. 63/403,613, filed Sep. 2, 2022, which is hereby incorporated by reference herein in its entirety.

BACKGROUND

This disclosure relates generally to electronic devices and, more particularly, to electronic devices with wireless communications capabilities.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies and with satisfactory efficiency bandwidth.

SUMMARY

An electronic device may be provided with a housing and wireless circuitry. The wireless circuitry may include antennas. One of the antennas may be disposed on a first substrate. The first substrate may be mounted to a second substrate. The housing may include a dielectric cover layer and a conductive plate on the dielectric cover layer. The housing may also include a conductive mid-chassis. The second substrate may be mounted to the mid-chassis. The conductive plate may be removable from the dielectric cover layer.

The antenna may include an antenna resonating element formed from a conductive patch on the first substrate. The antenna may also include a conductive ring on the first substrate. The conductive patch may extend from a segment of the conductive ring. The conductive plate may have an opening. The antenna resonating element may be aligned with the opening. The first substrate may be separated from the dielectric cover layer by an air gap aligned with the opening. A conductive gasket may couple the conductive ring to the conductive plate and may laterally surround the air gap and the opening. The antenna may convey ultra-wideband (UWB) signals through the air gap, the opening, and the dielectric cover layer.

DETAILED DESCRIPTION

Figure 1:
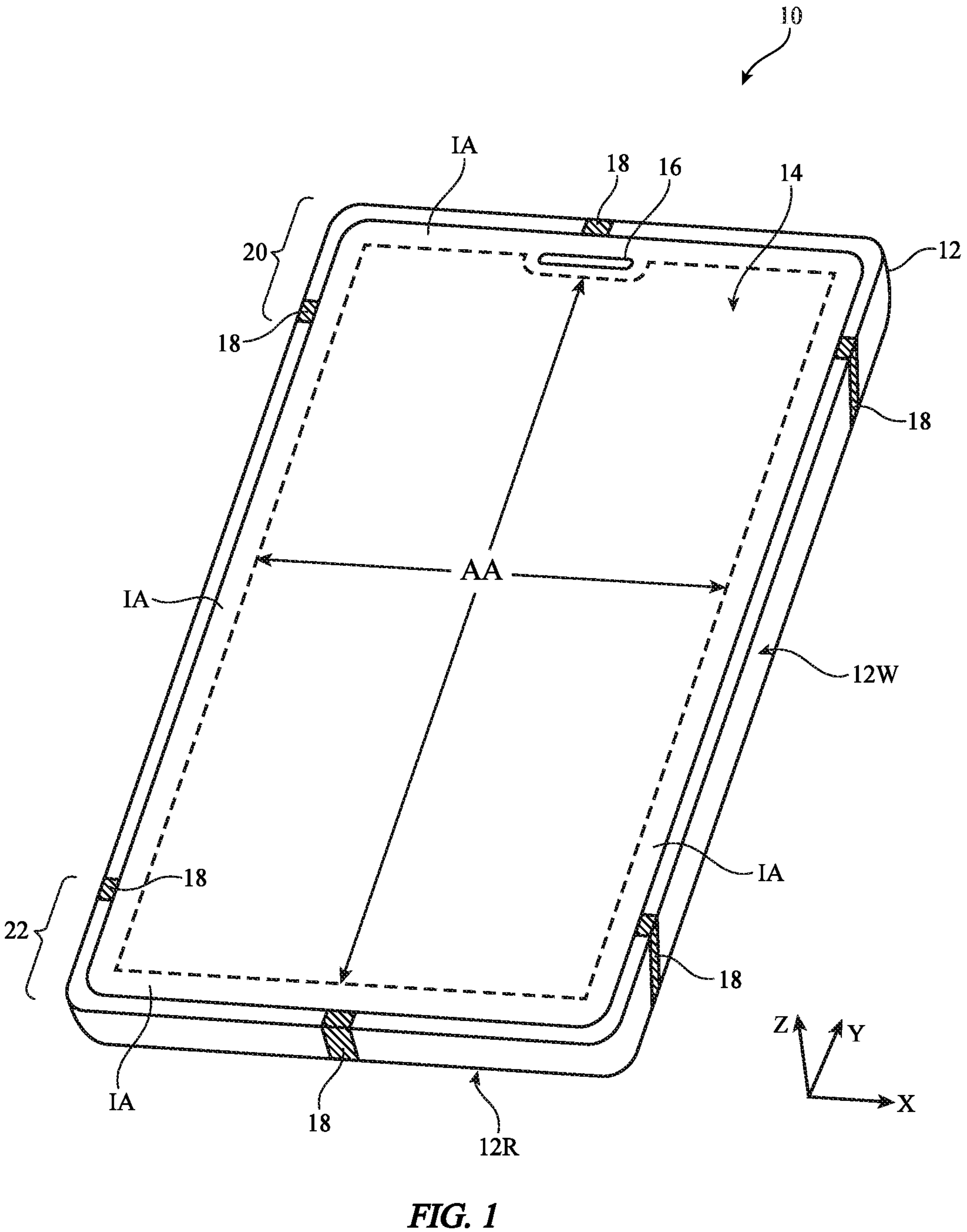
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as a notch that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms the notch of inactive area IA). The notch may be a substantially rectangular region that is surrounded (defined) on three sides by active area AA and on a fourth side by peripheral conductive housing structures 12W.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in the notch or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14. In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. An example in which device 10 includes three or four upper antennas and five lower antennas is described herein as an example. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
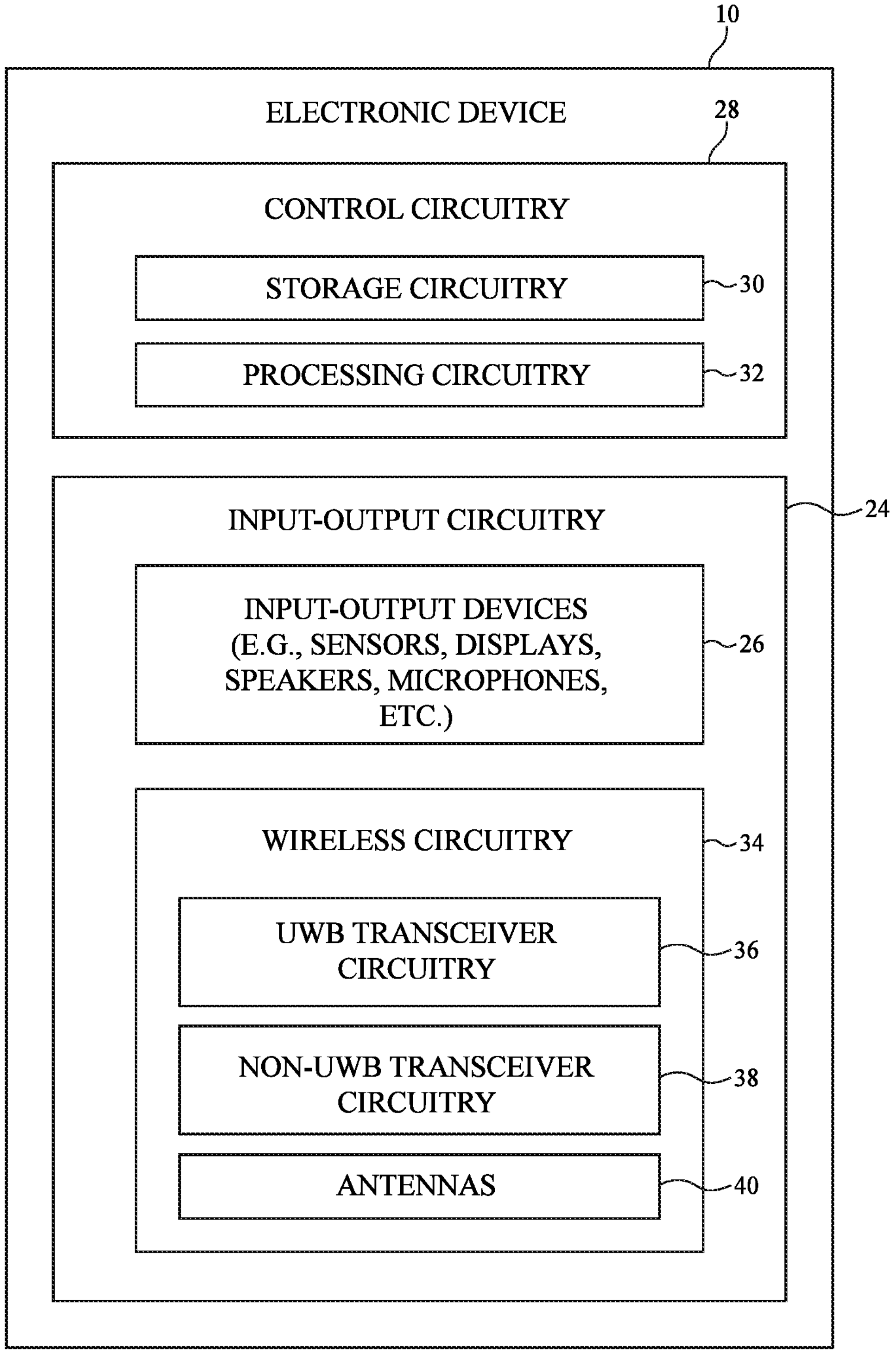
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 28. Control circuitry 28 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may include processing circuitry such as processing circuitry 32. Processing circuitry 32 may be used to control the operation of device 10. Processing circuitry 32 may include on one or more processors such as microprocessors, microcontrollers, digital signal processors, host processors, baseband processor integrated circuits, application specific integrated circuits, central processing units (CPUs), graphics processing units, etc. Control circuitry 28 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 28 may be used to run software on device 10 such as internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols, or any other desired communications protocols. Each communication protocol may be associated with a corresponding radio access technology (RAT) that specifies the physical connection methodology used in implementing the protocol.

Device 10 may include input-output circuitry 24. Input-output circuitry 24 may include input-output devices 26. Input-output devices 26 may be used to allow data to be supplied to device 10 and to allow data to be provided from device 10 to external devices. Input-output devices 26 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 24 may include wireless circuitry such as wireless circuitry 34 for wirelessly conveying radio-frequency signals. While control circuitry 28 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 28 (e.g., portions of control circuitry 28 may be implemented on wireless circuitry 34). As an example, control circuitry 28 may include baseband processor circuitry (e.g., one or more baseband processors) or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals (e.g., one or more RF front end modules, etc.). Wireless signals can also be sent using light (e.g., using infrared communications).

Wireless circuitry 34 may include radio-frequency transceiver circuitry for handling transmission and/or reception of radio-frequency signals within corresponding frequency bands at radio frequencies (sometimes referred to herein as communications bands or simply as "bands"). For example, wireless circuitry 34 may include ultra-wideband (UWB) transceiver circuitry 36 that supports communications using the IEEE 802.15.4 protocol and/or other ultra-wideband communications protocols. Ultra-wideband radio-frequency signals may be based on an impulse radio signaling scheme that uses band-limited data pulses. Ultra-wideband signals may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals). Ultra-wideband transceiver circuitry 36 may operate (i.e., convey radio-frequency signals) in frequency bands such as an ultra-wideband communications band between about 5 GHz and about 8.5 GHz (e.g., a 6.5 GHz UWB communications band, an 8 GHz UWB communications band, and/or at other suitable frequencies).

As shown in FIG. 2, wireless circuitry 34 may also include non-UWB transceiver circuitry 38. Non-UWB transceiver circuitry 38 may handle communications bands other than UWB communications bands such as wireless local area network (WLAN) frequency bands (e.g., Wi-Fi® (IEEE 802.11) or other WLAN communications bands) including a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands including the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLO- NASS) band, a BeiDou Navigation Satellite System (BDS) band, etc.), communications bands under the family of 3GPP wireless communications standards, communications bands under the IEEE 802.XX family of standards, industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Non-UWB transceiver circuitry 38 may also be used to perform spatial ranging operations if desired.

UWB transceiver circuitry 36 and non-UWB transceiver circuitry 38 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). The transceiver circuitry may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

As shown in FIG. 2, wireless circuitry 34 may include antennas 40. UWB transceiver circuitry 36 and non-UWB transceiver circuitry 38 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. In another suitable arrangement, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals). Different types of antennas may be used for different bands and combinations of bands.

Figure 3:
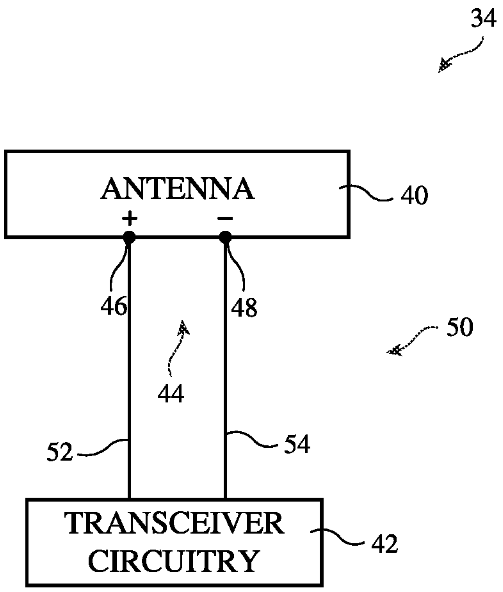
FIG. 3 is a schematic diagram of illustrative wireless circuitry in accordance with some embodiments.

A schematic diagram of wireless circuitry 34 is shown in FIG. 3. As shown in FIG. 3, wireless circuitry 34 may include transceiver circuitry 42 (e.g., UWB transceiver circuitry 36 or non-UWB transceiver circuitry 38 of FIG. 2) that is coupled to a given antenna 40 using a radio-frequency transmission line path such as radio-frequency transmission line path 50.

To provide antenna structures such as antenna 40 with the ability to cover different frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components that tune the antenna over communications (frequency) bands of interest. The tunable components may be part of a tunable filter or tunable impedance matching network, may be part of an antenna resonating element, may span a gap between an antenna resonating element and antenna ground, etc.

Radio-frequency transmission line path 50 may include one or more radio-frequency transmission lines (sometimes referred to herein simply as transmission lines). Radio-frequency transmission line path 50 (e.g., the transmission lines in radio-frequency transmission line path 50) may include a positive signal conductor such as positive signal conductor 52 and a ground signal conductor such as ground conductor 54.

The transmission lines in radio-frequency transmission line path 50 may, for example, include coaxial cable transmission lines (e.g., ground conductor 54 may be implemented as a grounded conductive braid surrounding signal conductor 52 along its length), stripline transmission lines (e.g., where ground conductor 54 extends along two sides of signal conductor 52), a microstrip transmission line (e.g., where ground conductor 54 extends along one side of signal conductor 52), coaxial probes realized by a metalized via, edge-coupled microstrip transmission lines, edge-coupled stripline transmission lines, waveguide structures (e.g., coplanar waveguides or grounded coplanar waveguides), combinations of these types of transmission lines and/or other transmission line structures, etc.

Transmission lines in radio-frequency transmission line path 50 may be integrated into rigid and/or flexible printed circuit boards. In one suitable arrangement, radio-frequency transmission line path 50 may include transmission line conductors (e.g., signal conductors 52 and ground conductors 54) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network may include components such as inductors, resistors, and capacitors used in matching the impedance of antenna 40 to the impedance of radio-frequency transmission line path 50. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Radio-frequency transmission line path 50 may be coupled to antenna feed structures associated with antenna 40. As an example, antenna 40 may form an inverted-F antenna, a planar inverted-F antenna, a patch antenna, or other antenna having an antenna feed 44 with a positive antenna feed terminal such as positive antenna feed terminal 46 and a ground antenna feed terminal such as ground antenna feed terminal 48. Positive antenna feed terminal 46 may be coupled to an antenna resonating element for antenna 40 (e.g., a fed arm of antenna 40). Ground antenna feed terminal 48 may be coupled to an antenna ground for antenna 40. If desired, antenna 40 may have one or more antenna resonating elements that are not coupled or directly connected to a corresponding positive antenna feed terminal (e.g., a parasitic or unfed arm of antenna 40). The unfed arm(s) in antenna 40 may, if desired, be fed by one or more fed arms of antenna 40 (e.g., via near-field electromagnetic coupling).

Signal conductor 52 may be coupled to positive antenna feed terminal 46 and ground conductor 54 may be coupled to ground antenna feed terminal 48. Other types of antenna feed arrangements may be used if desired. For example, antenna 40 may be fed using multiple feeds each coupled to a respective port of transceiver circuitry 42 over a corresponding transmission line. If desired, signal conductor 52 may be coupled to multiple locations on antenna 40 (e.g., antenna 40 may include multiple positive antenna feed terminals coupled to signal conductor 52 of the same radio-frequency transmission line path 50). Switches may be interposed on the signal conductor between transceiver circuitry 42 and the positive antenna feed terminals if desired (e.g., to selectively activate one or more positive antenna feed terminals at any given time). The illustrative feeding configuration of FIG. 3 is merely illustrative.

During operation, device 10 may communicate with external wireless equipment. If desired, device 10 may use radio-frequency signals conveyed between device 10 and the external wireless equipment to identify a location of the external wireless equipment relative to device 10. Device 10 may identify the relative location of the external wireless equipment by identifying a range to the external wireless equipment (e.g., the distance between the external wireless equipment and device 10) and the angle of arrival (AoA) of radio-frequency signals from the external wireless equipment (e.g., the angle at which radio-frequency signals are received by device 10 from the external wireless equipment).

Figure 4:
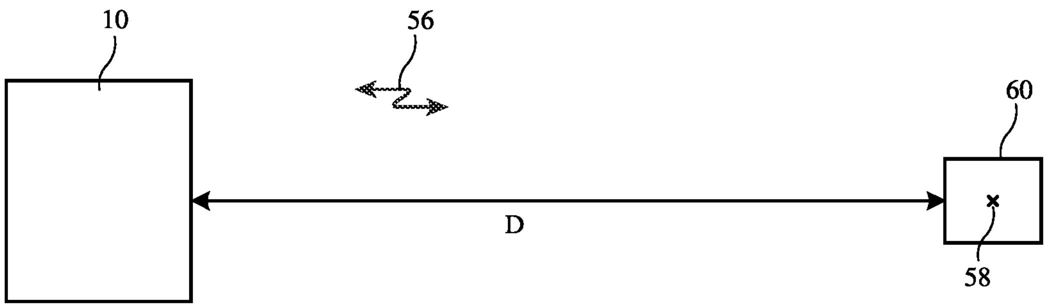
FIG. 4 is a diagram of an illustrative electronic device in wireless communication with an external node in a network in accordance with some embodiments.

FIG. 4 is a diagram showing how device 10 may determine a distance D between device 10 and external wireless equipment such as wireless network node 60 (sometimes referred to herein as wireless equipment 60, wireless device 60, external device 60, or external equipment 60). Node 60 may include devices that are capable of receiving and/or transmitting radio-frequency signals such as radio-frequency signals 56. Node 60 may include tagged devices (e.g., any suitable object that has been provided with a wireless receiver and/or a wireless transmitter), electronic equipment (e.g., an infrastructure-related device), and/or other electronic devices (e.g., devices of the type described in connection with FIG. 1, including some or all of the same wireless communications capabilities as device 10).

For example, node 60 may be a laptop computer, a tablet computer, a somewhat smaller device such as a wrist-watch device, pendant device, headphone device, earpiece device, headset device (e.g., virtual or augmented reality headset devices), or other wearable or miniature device, a handheld device such as a cellular telephone, a media player, or other small portable device. Node 60 may also be a set-top box, a camera device with wireless communications capabilities, a desktop computer, a display into which a computer or other processing circuitry has been integrated, a display without an integrated computer, or other suitable electronic equipment. Node 60 may also be a key fob, a wallet, a book, a pen, or other object that has been provided with a low-power transmitter (e.g., an RFID transmitter or other transmitter). Node 60 may be electronic equipment such as a thermostat, a smoke detector, a Bluetooth® Low Energy (Bluetooth LE) beacon, a Wi-Fi® wireless access point, a wireless base station, a server, a heating, ventilation, and air conditioning (HVAC) system (sometimes referred to as a temperature-control system), a light source such as a light-emitting diode (LED) bulb, a light switch, a power outlet, an occupancy detector (e.g., an active or passive infrared light detector, a microwave detector, etc.), a door sensor, a moisture sensor, an electronic door lock, a security camera, or other device. Device 10 may also be one of these types of devices if desired.

As shown in FIG. 4, device 10 may communicate with node 60 using wireless radio-frequency signals 56. Radio-frequency signals 56 may include Bluetooth® signals, near-field communications signals, wireless local area network signals such as IEEE 802.11 signals, millimeter wave communication signals such as signals at 60 GHz, UWB signals, other radio-frequency wireless signals, infrared signals, etc. In one suitable arrangement that is described herein by example, radio-frequency signals 56 are UWB signals conveyed in one or more UWB communications bands such as the 6.5 GHz and 8 GHz UWB communications bands. Radio-frequency signals 56 may be used to determine and/or convey information such as location and orientation information. For example, control circuitry 28 in device 10 (FIG. 2) may determine the location 58 of node 60 relative to device 10 using radio-frequency signals 56.

In arrangements where node 60 is capable of sending or receiving communications signals, control circuitry 28 (FIG. 2) on device 10 may determine distance D using radio-frequency signals 56 of FIG. 4. The control circuitry may determine distance D using signal strength measurement schemes (e.g., measuring the signal strength of radio-frequency signals 56 from node 60) or using time-based measurement schemes such as time of flight measurement techniques, time difference of arrival measurement techniques, angle of arrival measurement techniques, triangulation methods, time-of-flight methods, using a crowdsourced location database, and other suitable measurement techniques. This is merely illustrative, however. If desired, the control circuitry may use information from Global Positioning System receiver circuitry, proximity sensors (e.g., infrared proximity sensors or other proximity sensors), image data from a camera, motion sensor data from motion sensors, and/or using other circuitry on device 10 to help determine distance D. In addition to determining the distance D between device 10 and node 60, the control circuitry may determine the orientation of device 10 relative to node 60.

Figure 5:
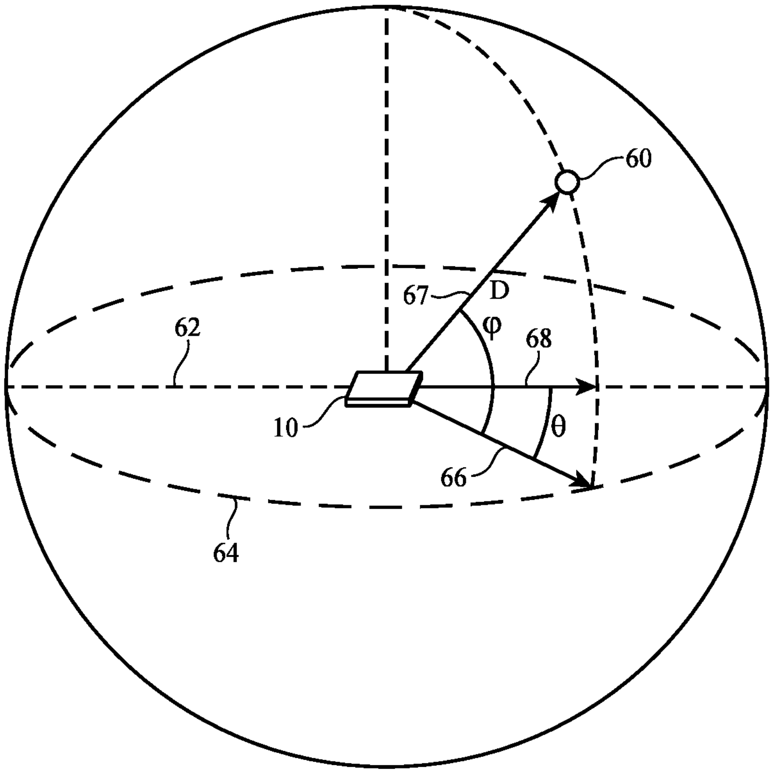
FIG. 5 is a diagram showing how the location (e.g., range and angle of arrival) of an external node in a network may be determined relative to an electronic device in accordance with some embodiments.

FIG. 5 illustrates how the position and orientation of device 10 relative to nearby nodes such as node 60 may be determined. In the example of FIG. 5, the control circuitry on device 10 (e.g., control circuitry 28 of FIG. 2) uses a horizontal polar coordinate system to determine the location and orientation of device 10 relative to node 60. In this type of coordinate system, the control circuitry may determine an azimuth angle θ and/or an elevation angle φ to describe the position of nearby nodes 60 relative to device 10. The control circuitry may define a reference plane such as local horizon 64 and a reference vector such as reference vector 68. Local horizon 64 may be a plane that intersects device 10 and that is defined relative to a surface of device 10 (e.g., the front or rear face of device 10). For example, local horizon 64 may be a plane that is parallel to or coplanar with display 14 of device 10 (FIG. 1). Reference vector 68 (sometimes referred to as the "north" direction) may be a vector in local horizon 64. If desired, reference vector 68 may be aligned with longitudinal axis 62 of device 10 (e.g., an axis running lengthwise down the center of device 10 and parallel to the longest rectangular dimension of device 10, parallel to the Y-axis of FIG. 1). When reference vector 68 is aligned with longitudinal axis 62 of device 10, reference vector 68 may correspond to the direction in which device 10 is being pointed.

Azimuth angle θ and elevation angle φ may be measured relative to local horizon 64 and reference vector 68. As shown in FIG. 5, the elevation angle φ (sometimes referred to as altitude) of node 60 is the angle between node 60 and local horizon 64 of device 10 (e.g., the angle between vector 67 extending between device 10 and node 60 and a coplanar vector 66 extending between device 10 and local horizon 64). The azimuth angle θ of node 60 is the angle of node 60 around local horizon 64 (e.g., the angle between reference vector 68 and vector 66). In the example of FIG. 5, the azimuth angle θ and elevation angle φ of node 60 are greater than 0°.

If desired, other axes besides longitudinal axis 62 may be used to define reference vector 68. For example, the control circuitry may use a horizontal axis that is perpendicular to longitudinal axis 62 as reference vector 68. This may be useful in determining when nodes 60 are located next to a side portion of device 10 (e.g., when device 10 is oriented side-to-side with one of nodes 60).

After determining the orientation of device 10 relative to node 60, the control circuitry on device 10 may take suitable action. For example, the control circuitry may send information to node 60, may request and/or receive information from 60, may use display 14 (FIG. 1) to display a visual indication of wireless pairing with node 60, may use speakers to generate an audio indication of wireless pairing with node 60, may use a vibrator, a haptic actuator, or other mechanical element to generate haptic output indicating wireless pairing with node 60, may use display 14 to display a visual indication of the location of node 60 relative to device 10, may use speakers to generate an audio indication of the location of node 60, may use a vibrator, a haptic actuator, or other mechanical element to generate haptic output indicating the location of node 60, and/or may take other suitable action.

In one suitable arrangement, device 10 may determine the distance between the device 10 and node 60 and the orientation of device 10 relative to node 60 using one or more ultra-wideband antennas. The ultra-wide band antennas may receive radio-frequency signals from node 60 (e.g., radio-frequency signals 56 of FIG. 4). Time stamps in the wireless communication signals may be analyzed to determine the time of flight of the wireless communication signals and thereby determine the distance (range) between device 10 and node 60. In implementations where device 10 includes two or more ultra-wideband antennas, angle of arrival (AoA) measurement techniques may be used to determine the orientation of electronic device 10 relative to node 60 (e.g., azimuth angle θ and elevation angle (p).

In angle of arrival measurement, node 60 transmits a radio-frequency signal to device 10 (e.g., radio-frequency signals 56 of FIG. 4). Device 10 may measure a delay in arrival time of the radio-frequency signals between the two or more ultra-wideband antennas. The delay in arrival time (e.g., the difference in received phase at each ultra-wideband antenna) can be used to determine the angle of arrival of the radio-frequency signal (and therefore the angle of node 60 relative to device 10). Once distance D and the angle of arrival have been determined, device 10 may have knowledge of the precise location of node 60 relative to device 10.

Figure 6:
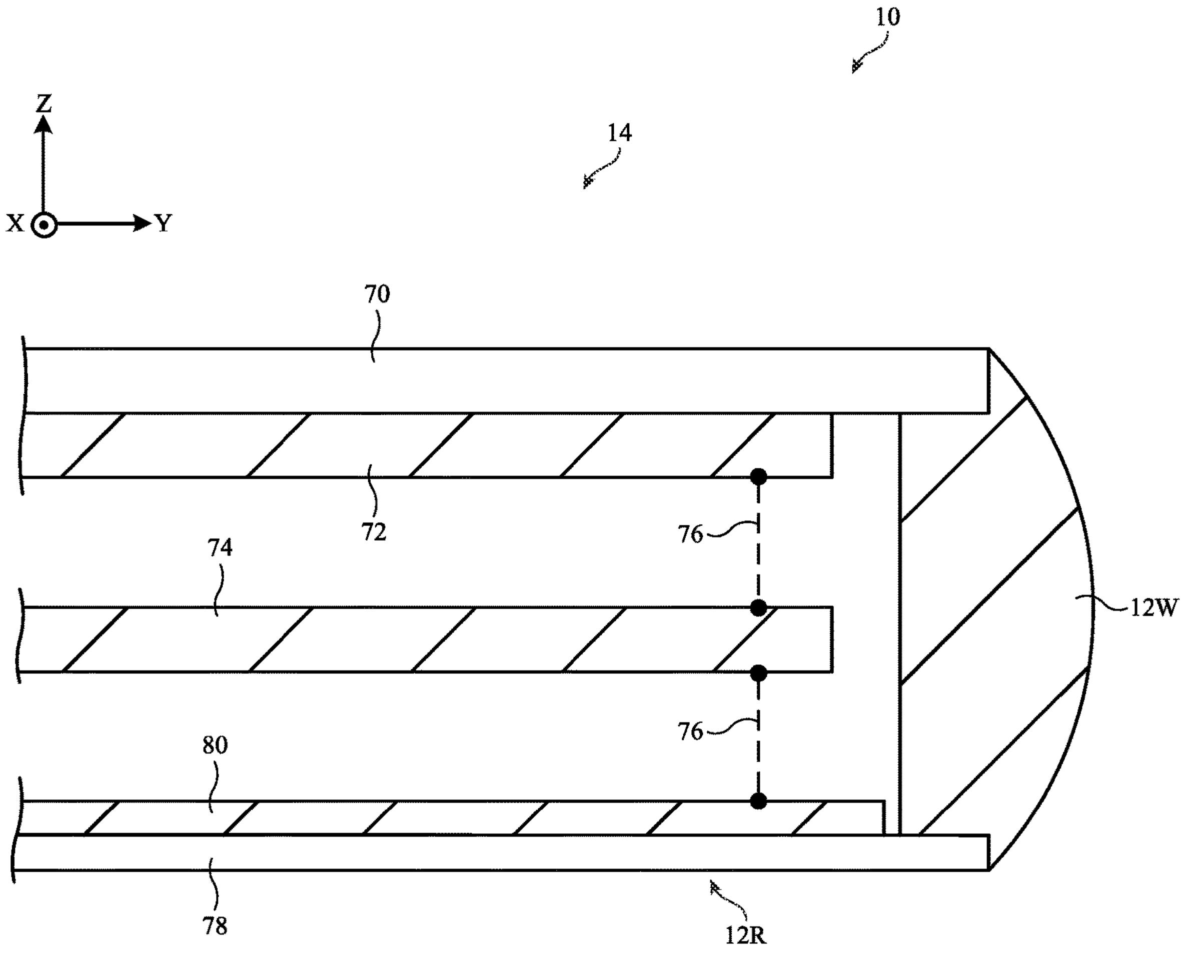
FIG. 6 is a cross-sectional side view of an electronic device having housing structures that may be used in forming antenna structures in accordance with some embodiments.

If desired, conductive electronic device structures such as conductive portions of housing 12 (FIG. 1) may be used to form at least part of one or more of the antennas 40 in device 10. FIG. 6 is a cross-sectional side view of device 10, showing illustrative conductive electronic device structures that may be used in forming one or more of the antennas 40 in device 10.

As shown in FIG. 6, peripheral conductive housing structures 12W may extend around the lateral periphery of device 10 (e.g., as measured in the X-Y plane of FIG. 1). Peripheral conductive housing structures 12W may extend from rear housing wall 12R (e.g., at the rear face of device 10) to display 14 (e.g., at the front face of device 10). In other words, peripheral conductive housing structures 12W may form conductive sidewalls for device 10, a first of which is shown in the cross-sectional side view of FIG. 6 (e.g., a given sidewall that runs along an edge of device 10 and that extends across the width or length of device 10).

Display 14 may have a display module such as display module 72 (sometimes referred to as a display panel). Display module 72 may include pixel circuitry, touch sensor circuitry, force sensor circuitry, and/or any other desired circuitry for forming active area AA of display 14. Display 14 may include a dielectric cover layer such as display cover layer 70 that overlaps display module 70. Display cover layer 70 may include plastic, glass, sapphire, ceramic, and/or any other desired dielectric materials. Display module 72 may emit image light and may receive sensor input (e.g., touch and/or force sensor input) through display cover layer 70. Display cover layer 70 and display 14 may be mounted to peripheral conductive housing structures 12W. The lateral area of display 14 that does not overlap display module 72 may form inactive area IA of display 14 (FIG. 1).

As shown in FIG. 6, rear housing wall 12R may be mounted to peripheral conductive housing structures 12W (e.g., opposite display 14). Rear housing wall 12R may include a conductive layer such as conductive support plate 80. Conductive support plate 80 may extend across an entirety of the width of device 10 (e.g., between the left and right edges of device 10 as shown in FIG. 1). Conductive support plate 80 may be formed from an integral portion of peripheral conductive housing structures 12W that extends across the width of device 10 or may include a separate housing structure attached, coupled, or affixed to peripheral conductive housing structures 12W.

If desired, rear housing wall 12R may include a dielectric cover layer such as dielectric cover layer 78. Dielectric cover layer 78 may include glass, plastic, sapphire, ceramic, one or more dielectric coatings, or other dielectric materials. Dielectric cover layer 78 may be layered under conductive support plate 80 (e.g., conductive support plate 80 may be coupled or mounted to an interior surface of dielectric cover layer 78). If desired, dielectric cover layer 78 may extend across an entirety of the width of device 10 and/or an entirety of the length of device 10. Conductive support plate 80 may, if desired, be a removable support plate or a support plate integrated into a removable assembly or sub-assembly in device 10 that is removable from rear housing wall 12R (e.g., there may be no adhesive attaching conductive support plate 80 to dielectric cover layer 78).

The housing for device 10 may also include one or more additional conductive support plates interposed between display 14 and rear housing wall 12R. For example, the housing for device 10 may include a conductive support plate such as mid-chassis 74 (sometimes referred to herein as conductive support plate 74). Mid-chassis 74 may be vertically interposed between rear housing wall 12R and display 14 (e.g., conductive support plate 80 may be located at a first distance from display 14 whereas mid-chassis 74 is located at a second distance that is less than the first distance from display 14). Mid-chassis 74 may extend across an entirety of the width of device 10 (e.g., between the left and right edges of device 10 as shown in FIG. 1). Mid-chassis 74 may be formed from an integral portion of peripheral conductive housing structures 12W that extends across the width of device 10 or may include a separate housing structure attached, coupled, or affixed to peripheral conductive housing structures 12W. One or more components may be supported by mid-chassis 74 (e.g., logic boards such as a main logic board, a battery, etc.) and/or mid-chassis 74 may contribute to the mechanical strength of device 10. Mid-chassis 74 may be formed from metal (e.g., stainless steel, aluminum, etc.).

Conductive housing structures such as conductive support plate 80, mid-chassis 74, conductive portions of display module 72, and/or peripheral conductive housing structures 12W may be used to form antenna structures for one or more of the antennas 40 in device 10. For example, peripheral conductive housing structures 12W may form an antenna resonating element arm (e.g., an inverted-F antenna resonating element arm) for one or more of the antennas 40 in device 10. Mid-chassis 74, conductive support plate 80, and/or display module 72 may be used to form the corresponding antenna ground for one or more of the antennas 40 in device 10, a reflective antenna cavity backing, waveguide structures, etc. One or more conductive interconnect structures 76 may electrically couple mid-chassis 74 to conductive support plate 80 and/or one or more conductive interconnect structures 76 may electrically couple mid-chassis 74 to conductive structures in display module 72 (sometimes referred to herein as conductive display structures) so that each of these elements form part of the antenna ground. The conductive display structures may include a conductive frame, bracket, or support for display module 72, shielding layers in display module 72, ground traces in display module 72, etc.

Conductive interconnect structures 76 may serve to ground mid-chassis 74 to conductive support plate 80 and/or display module 72 (e.g., to ground conductive support plate 80 to the conductive display structures through mid-chassis 74). Put differently, conductive interconnect structures 76 may hold the conductive display structures, mid-chassis 74, and/or conductive support plate 80 to a common ground or reference potential (e.g., as a system ground for device 10 that is used to form part of the antenna ground). Conductive interconnect structures 76 may therefore sometimes be referred to herein as grounding structures 76, grounding interconnect structures 76, or vertical grounding structures 76. Conductive interconnect structures 76 may include conductive traces, conductive pins, conductive springs, conductive prongs, conductive brackets, conductive screws, conductive clips, conductive tape, conductive wires, conductive traces, conductive foam, conductive adhesive, solder, welds, metal members (e.g., sheet metal members), contact pads, conductive vias, conductive portions of one or more components mounted to mid-chassis 74 and/or conductive support plate 80, and/or any other desired conductive interconnect structures.

Antennas 40 in device 10 that convey UWB signals may sometimes be referred to herein as UWB antennas. UWB antennas may be disposed at different locations in device 10 for conveying UWB signals through different sides of device 10 (e.g., to measure the distance an external device using UWB signals regardless of the orientation of device 10 relative to the external device). One of the UWB antennas may, for example, radiate through rear housing wall 12R for measuring the distance to an external object when the rear of device 10 faces the external object. If care is not taken, the presence of conductive material in rear housing wall 12R (e.g., conductive support plate 80) may block the UWB signals from passing through rear housing wall 12R.

Figure 7:
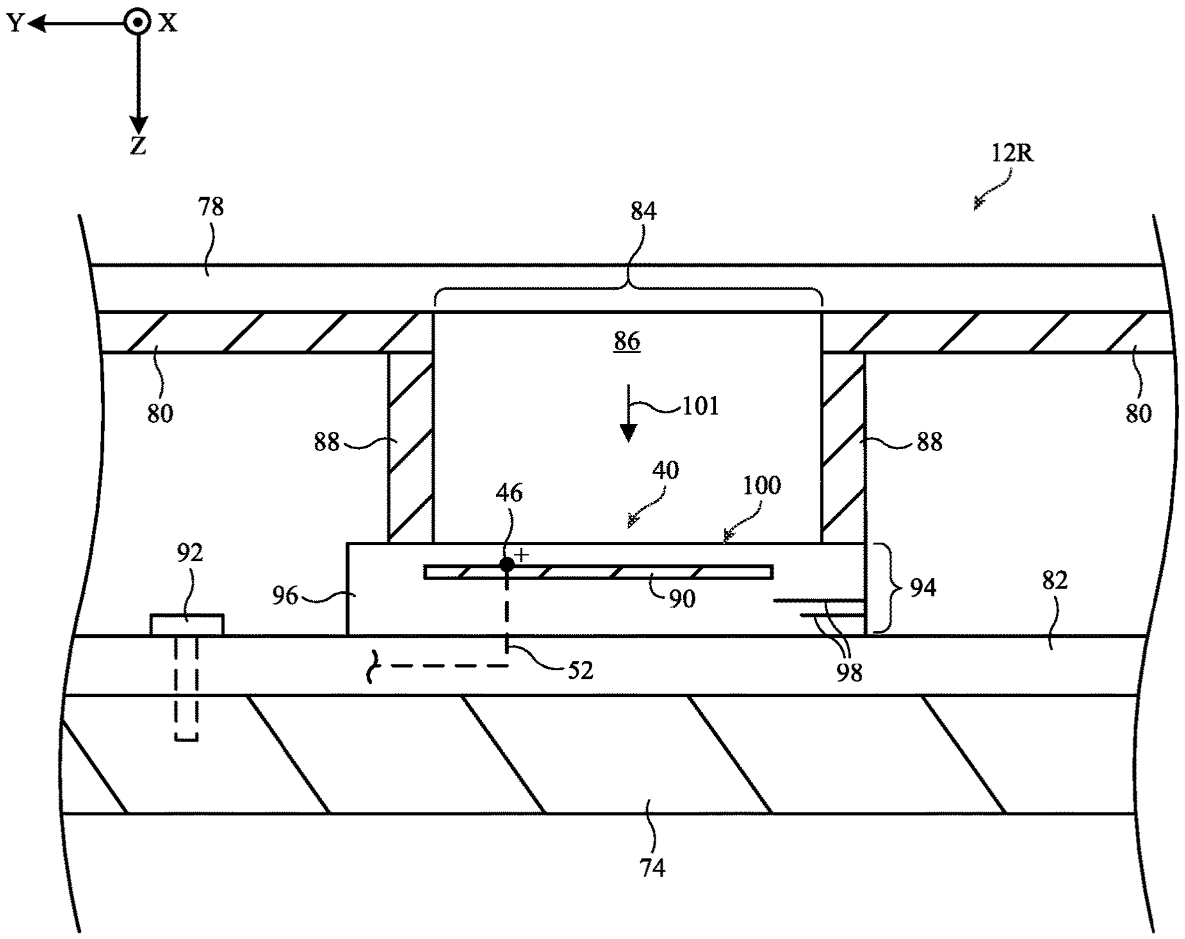
FIG. 7 is a cross-sectional side view of an illustrative ultra-wideband antenna mounted within an electronic device in accordance with some embodiments.

FIG. 7 is a cross-sectional side view showing how an antenna may be mounted within device 10 for conveying UWB signals or other radio-frequency signals through rear housing wall 12R. As shown in FIG. 7, a dielectric opening such as opening 84 may be formed in conductive support plate 80 of rear housing wall 12R (e.g., as a cut-out, stamped-out, or etched region of conductive support plate 80). Opening 84 (sometimes referred to herein as aperture 84, antenna aperture 84, antenna window 84, gap 84, or slot 84) may be free from conductive material to allow radio-frequency signals (e.g., UWB signals) to pass through rear housing wall 12R. Antenna 40 may be aligned with (e.g., may partially or completely overlap) opening 84.

Antenna 40 may be integrated into an antenna module 94 that is mounted within the interior of device 10 (sometimes referred to herein as antenna system 94 or antenna assembly 94). Antenna module 94 may include an antenna support structure such as substrate 96. Substrate 96 may be a rigid or flexible printed circuit board, for example. Substrate 96 may include one or more stacked dielectric layers 98 (e.g., layers of rigid or flexible printed circuit board material). Substrate 96 and antenna 40 may be mounted to an underlying support structure such as support 82. Support 82 may include a rigid or flexible printed circuit substrate and/or one or more conductive layers, for example.

Support 82 may be mounted to, layered on, or otherwise coupled to mid-chassis 74. If desired, conductive interconnect structures such as conductive interconnect structure 92 may couple support 82 to mid-chassis 74. Conductive interconnect structure 92 may include a conductive screw, a conductive clip, a conductive pin, solder, welds, conductive traces, conductive wire, conductive adhesive conductive foam, a conductive spring, and/or any other desired interconnect structures. Conductive interconnect structure 92 may electrically couple one or more conductive structures on support 82 such as ground traces on support 82 to mid-chassis 74 (e.g., to hold the conductive structures on support 82 at a ground potential to form part of the antenna ground for antenna 40). Conductive interconnect structure 92 may also help to mechanically secure, attach, or affix support 82 and antenna module 94 to mid-chassis 74. If desired, one or more other components may be interposed between support 82 and mid-chassis 74 (e.g., support 82 may be layered on or mounted to the one or more other components). The one or more other components may be additional printed circuit boards or portions of other components in device 10 such as a radio-frequency transceiver, a speaker receiver, etc.

Antenna 40 may include one or more antenna resonating elements on substrate 96 such as antenna resonating element 90. Antenna resonating element 90 may be aligned with or may at least partially overlap opening 84 in conductive support plate 80. Antenna resonating element 90 (sometimes referred to herein as antenna radiating element 90, antenna radiator 90, or antenna resonator 90) may include one or more radiating (resonating) arms, slots, waveguides, patches, or any other desired conductive antenna structures on one or more dielectric layers 98 that convey radio-frequency current associated with the radio-frequency signals transmitted and/or received by antenna 40. Antenna resonating element 90 may be disposed on top (exterior) surface 100 of substrate 96 or embedded within substrate 96.

Positive antenna feed terminal 46 may be coupled to antenna resonating element 90. One or more radio-frequency transmission lines may pass through support 82 and substrate 96 to feed antenna 40. For example, signal conductor 52 may be coupled to positive antenna feed terminal 46 through substrate 96 and support 82. Signal conductor 52 may include conductive traces (e.g., signal traces) and/or conductive vias (e.g., signal vias) on support 82 and substrate 96, for example. Substrate 96 may be mounted to support 82 using adhesive, solder, welds, or any other desired interconnect structures.

Antenna 40 (e.g., antenna resonating element 90 or top surface 100 of substrate 96) may be separated from the interior surface of dielectric cover layer 78 by a gap such as air gap 86. Air gap 86 may be filled with air or may, if desired, be at least partially filled with other dielectric materials. If desired, an opaque masking layer such as an ink layer (not shown) may be disposed on the interior surface of dielectric cover layer 78 to help hide antenna 40 from view. Antenna resonating element 90 may transmit radio-frequency signals and/or may receive radio-frequency signals (e.g., UWB signals) through air gap 86, opening 84, and dielectric cover layer 78. In this way, antenna 40 may convey radio-frequency signals through rear housing wall 12R despite the presence of conductive support plate 80.

In some implementations, substrate 96 (e.g., top surface 100) may be pressed against or mounted to conductive support plate 80 (e.g., using adhesive). In the example of FIG. 7, substrate 96 is separated from conductive support plate 80 by a non-zero distance (e.g., by the length of air gap 86 as measured parallel to the Z-axis). If desired, a conductive gasket such as conductive gasket 88 may couple substrate 96 to conductive support plate 80. Conductive gasket 88 may be mounted to conductive traces on top surface 100 of substrate 96 such as ground traces used to form part of the antenna ground of antenna 40. Conductive gasket 88 may extend around a periphery of substrate 96 and antenna 40 to laterally surround the periphery of antenna resonating element 90 (e.g., when viewed in the direction of arrow 101). In this way, conductive gasket 88 may form an electromagnetic seal around air gap 86 for the radio-frequency signals conveyed by antenna 40. In other words, air gap 86 may form a conductive cavity through which antenna 40 radiates, where the edges of the conductive cavity are defined by ground traces on substrate 96 and support 82, conductive gasket 88, and conductive support plate 80. Conductive gasket 88 may be formed from conductive foam or other compressible conductive materials that are opaque to radio-frequency signals, for example.

Antenna 40 may be removable from dielectric cover layer 78 of rear housing wall 12R if desired. For example, conductive support plate 80, conductive gasket 88, antenna module 94, and support 82 may form integral parts of a removable antenna subassembly that is screwed into mid-chassis 74 (e.g., using conductive interconnect structure 92) and pressed against dielectric cover layer 78 during assembly of device 10. Conductive support plate 80 may be pressed against dielectric cover layer 78 without any intervening adhesive layers, if desired.

Any desired antenna structures may be used for implementing antenna resonating element 90. In some arrangements that are described herein as an example, planar inverted-F antenna structures may be used for implementing antenna resonating element 90. Antennas that are implemented using planar inverted-F antenna structures may sometimes be referred to as planar inverted-F antennas. Planar inverted-F antennas are inverted-F antennas having a planar radiating arm that extends across a corresponding lateral surface area.

Figure 8:
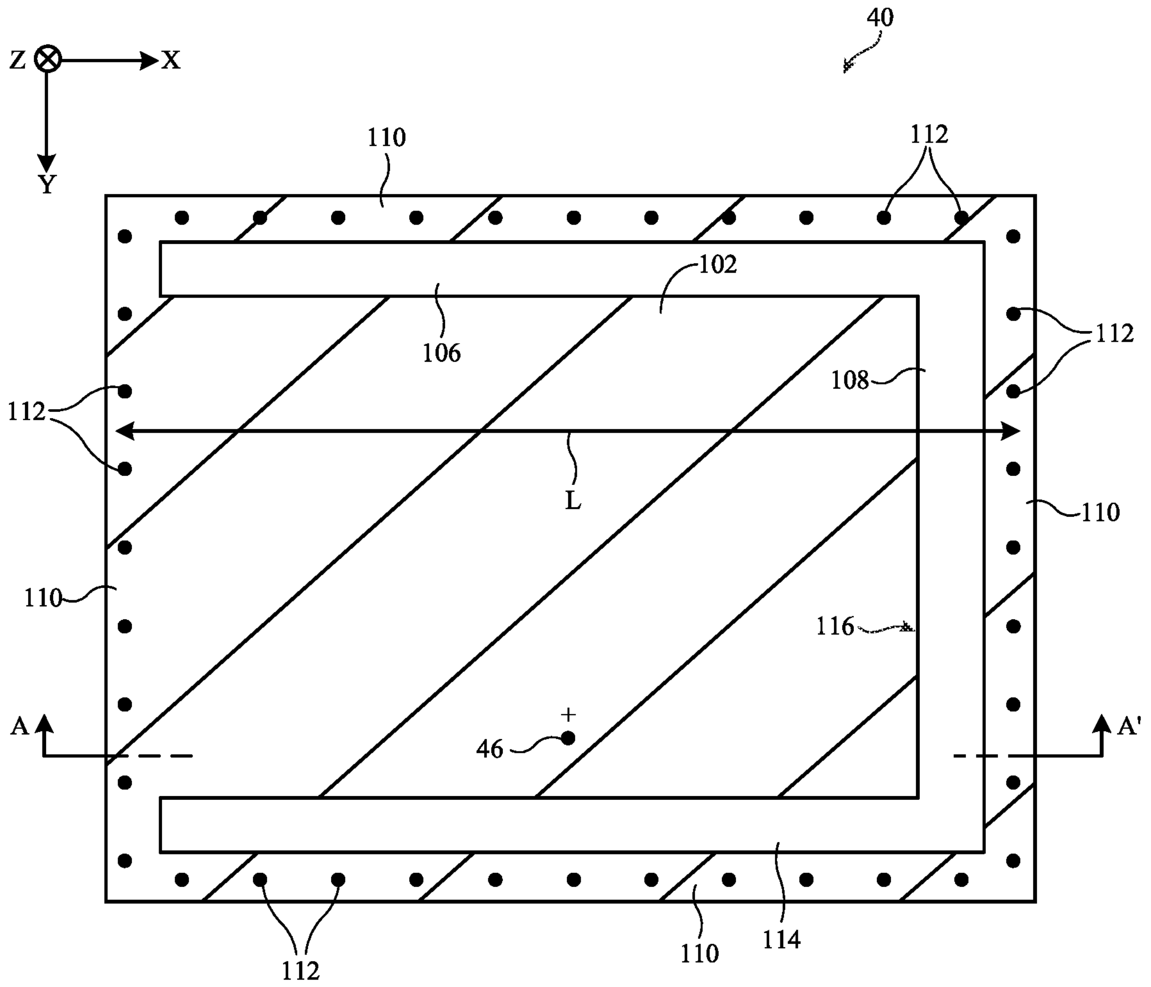
FIG. 8 is a bottom view of an illustrative ultra-wideband antenna in accordance with some embodiments.

FIG. 8 is a bottom-up view antenna 40 (e.g., as taken in the direction of arrow 101). As shown in FIG. 8, antenna 40 may include conductive structures such as conductive traces on a surface of substrate 96 (FIG. 7). Antenna resonating element 90 may include a radiating arm such as arm 102 (sometimes referred to herein as antenna arm 102 or resonating arm 102). Arm 102 may be formed from a patch of conductive traces and may have a planar shape with a length L (e.g., parallel to the X-axis). Arm 102 may have a perpendicular width (e.g., parallel to the Y-axis) such that arm 102 has a planar shape that laterally extends in a given plane (e.g., the X-Y plane of FIG. 8) parallel to an overlapping antenna ground. Positive antenna feed terminal 46 may be coupled to arm 102.

Length L may be selected to configure antenna resonating element 90 to radiate in a UWB frequency band such as UWB Channel 9. For example, length L may be approximately equal to (e.g., within 15% of) one-quarter of the effective wavelength corresponding to a frequency in the UWB frequency band. The effective wavelength is modified from a corresponding free-space wavelength by a constant value associated with the dielectric material used to form substrate 96 (e.g., the effective wavelength is found by multiplying the freespace wavelength by a constant value that is based on the dielectric constant $d_k$ of substrate 96).

If desired, an electromagnetic shielding (guard) ring such as grounded shielding ring 110 may laterally surround antenna resonating element 90 at the upper-most surface of substrate 96. Grounded shielding ring 110 may be formed from conductive traces on the surface of substrate 96. The conductive traces of grounded shielding ring 110 may be shorted to the antenna ground (e.g., underlying planar ground traces) by fences of conductive vias 112 extending through substrate 96. Each conductive via 112 may be separated from one or more adjacent conductive vias 112 by a sufficiently narrow distance such that the fence of conductive vias 112 appears as an open circuit (infinite impedance) to antenna currents in the UWB frequency band handled by antenna 40. As an example, each conductive via 112 in the fence may be separated from one or more adjacent conductive vias 112 by one-sixth of a wavelength covered by antenna 40, one-eighth of a wavelength covered by antenna 40, one-tenth of a wavelength covered by antenna 40, one-fifteenth of a wavelength covered by antenna 40, less than one-fifteenth of a wavelength covered by antenna 40, etc. Grounded shielding ring 110 may serve to isolate and shield antenna 40 from electromagnetic interference.

Grounded shielding ring 110, conductive vias 112, and the underlying planar ground traces on substrate 96 may collectively form an antenna ground for antenna 40. The antenna ground may include ground traces on one or more layers of substrate 96 beneath the upper-most layer of substrate 96, ground traces on support 82 (FIG. 8), conductive gasket 88 (FIG. 8), and/or conductive support plate 80 (FIG. 8). Each layer of ground traces in antenna 40 may be coupled together using conductive vias if desired (e.g., so that all of the ground traces are held at the same ground potential).

Arm 102 of antenna 40 may extend from a first (left) segment of grounded shielding ring 110 rightwards to an opposing radiating edge 116 (e.g., length L may be measured from grounded shielding ring 110 to radiating edge 116). Arm 102 may have longitudinal edges that extend along length L (e.g., parallel to the X-axis) from grounded shielding ring 110 to radiating edge 116. The uppermost edge of arm 102 may be separated from grounded shielding ring 110 by gap 106. Gap 106 may have a longitudinal axis extending parallel to the X-axis. The lowermost edge of arm 102 may be separated from grounded shielding ring 110 by gap 114. Gap 114 may have a longitudinal axis extending parallel to the X-axis (e.g., gaps 106 and 114 may extend in parallel). The conductive vias in the first segment of grounded shielding ring 110 (e.g., the left side of grounded shielding ring 110) may form a return path to ground for arm 102. Radiating edge 116 of arm 102 may be separated from the rightmost segment of grounded shielding ring 110 by gap 108. Gap 108 may extend parallel to the Y-axis (e.g., perpendicular to gaps 106 and 114). Gap 108 may couple gap 106 to gap 114 (e.g., gaps 106, 108, and 114 may collectively form a C-shaped gap in the conductive traces on substrate 96). Gaps 106, 108, and 114 may sometimes be referred to herein as slots (e.g., elongated slots) or openings in the conductive traces on substrate 96.

During radio-frequency transmission, antenna currents are conveyed over positive antenna feed terminal 46. The antenna currents flow around the edges of arm 102. The electric fields produced by the antenna currents on arm 102 may exhibit peak magnitudes at radiating edge 116 (e.g., within gap 108). The antenna currents on arm 102 may radiate corresponding radio-frequency signals into free space. Conversely, during signal reception, antenna currents produced on arm 102 by incident radio-frequency signals may be passed to positive antenna feed terminal 46. The example of FIG. 8 is merely illustrative. Arm 102 may have other shapes having any desired number of curved and/or straight edges.

Figure 9:
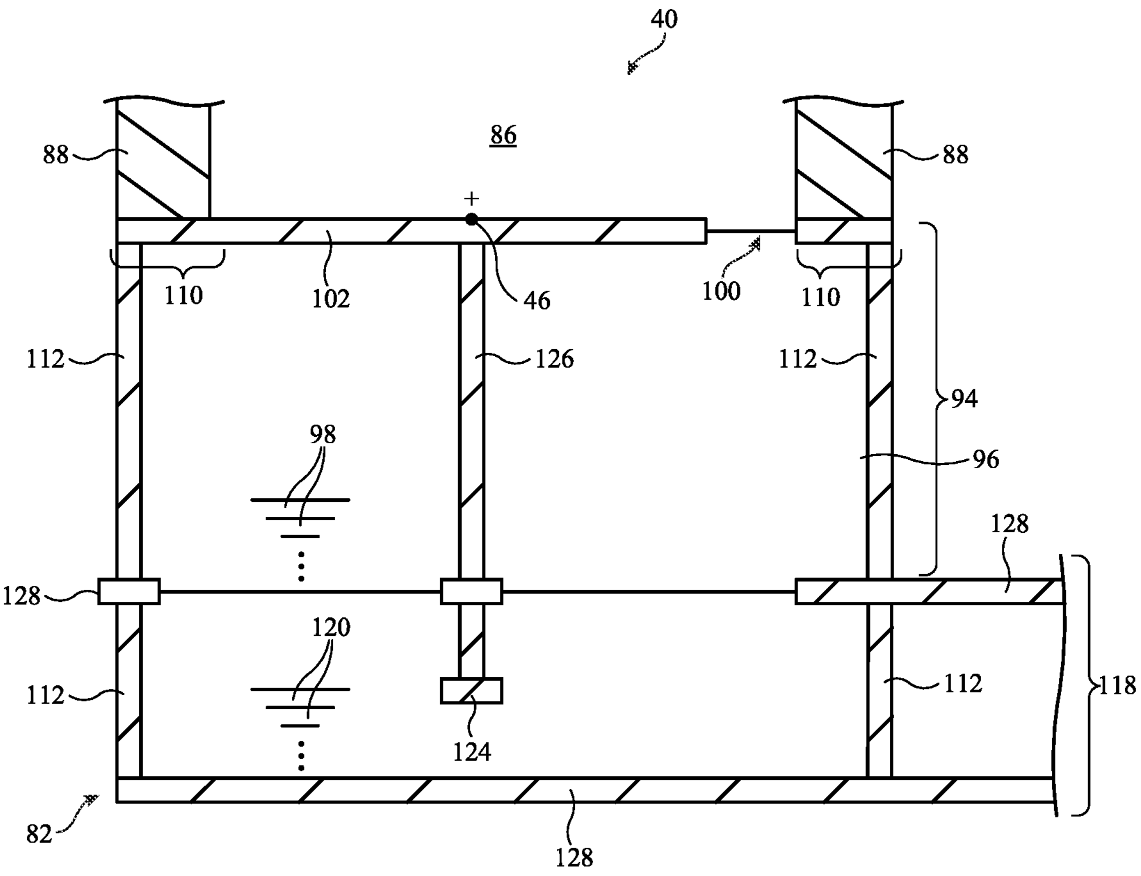
FIG. 9 is a cross-sectional side view showing how an illustrative ultra-wideband antenna may be integrated into a dielectric substrate in accordance with some embodiments.

When mounted within device 10, air gap 86 (FIG. 7) may overlap arm 102 and gaps 106, 108, and 114. Conductive gasket 88 (FIG. 7) may overlap grounded shielding ring 110 and may extend around the lateral periphery of arm 102. FIG. 9 is a cross-sectional side view of antenna 40 of FIG. 8 (e.g., as taken along line AA' of FIG. 8). As shown in FIG. 9, arm 102 and grounded shielding ring 110 may be formed from conductive traces on top surface 100 of substrate 96. Substrate 96 and antenna module 94 may be mounted to the top surface of a portion 118 of support 82. Portion 118 may be a flexible printed circuit, for example. Portion 118 may include one or more stacked layers 120 of dielectric material (e.g., flexible printed circuit material). A radio-frequency transmission line for antenna 40 may extend along portion 118 and may extend into substrate 96.

Portion 118 may include conductive traces that form a ground plane (layer) such as planar ground traces 128. Planar ground traces 128 may form part of the antenna ground for antenna 40. Planar ground traces 128 may be disposed on one or more surfaces of portion 118 and/or may be embedded within layers 120 of portion 118. Planar ground traces 128 may form a part of the radio-frequency transmission line for antenna 40 and may extend under antenna 40. Conductive vias may extend through portion 118 to short the planar ground traces 128 together if desired.

Signal traces 124 of the radio-frequency transmission line for antenna 40 (e.g., signal conductor 52 of FIG. 7) may also be disposed on one or more layers 120 of portion 118. The signal conductor may also include a conductive feed via 126 that extends through substrate 96 and that couples signal traces 124 to positive antenna feed terminal 46 at arm 102. Conductive vias 112 may couple grounded shielding ring 110 to one or more layers of planar ground traces 128 on portion 118. Conductive gasket 88 may be mounted to grounded shielding ring 110 and may electrically couple conductive support plate 80 (FIG. 7) to planar ground traces 128 via grounded shielding ring 110. The example of FIG. 9 is merely illustrative and, in general, any desired stack up may be used to dispose antenna 40 on substrate 96 and portion 118 of support 82.

Figure 10:
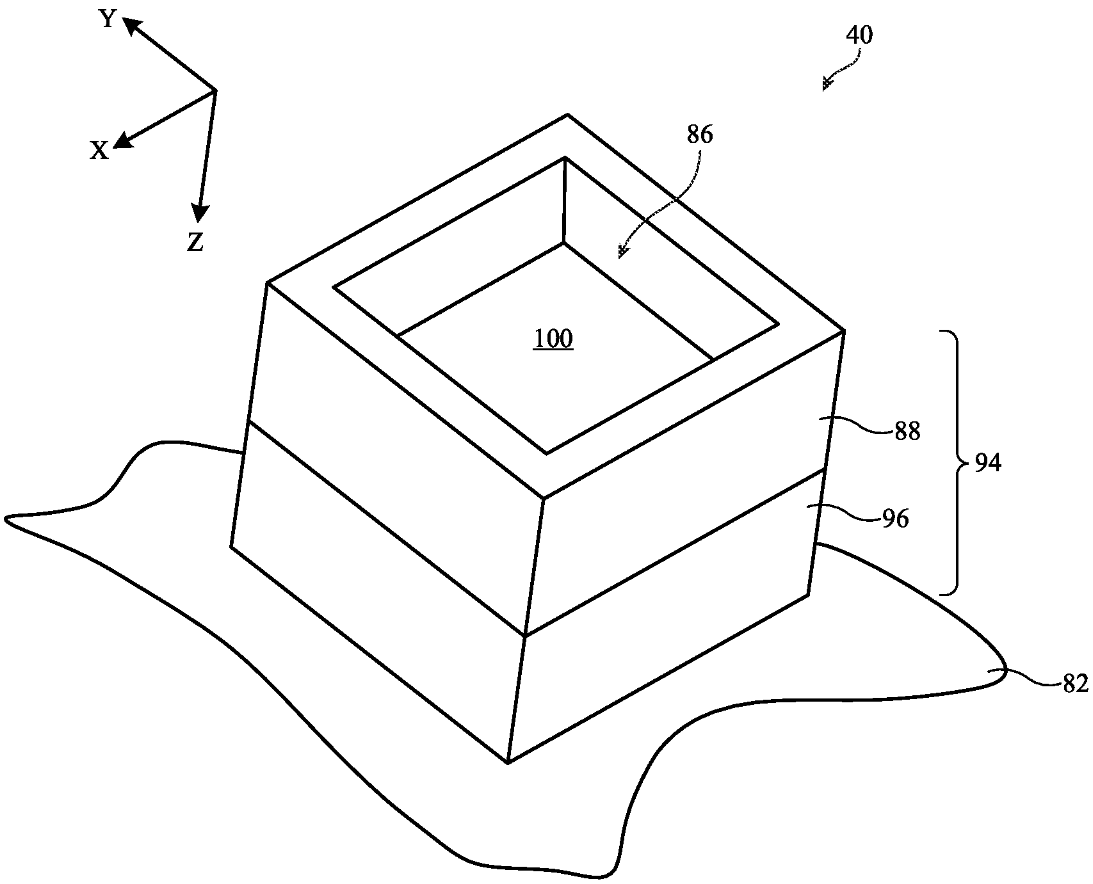
FIG. 10 is a perspective view showing how an illustrative ultrawideband antenna may be provided with an overlapping conductive gasket in accordance with some embodiments.

FIG. 10 is a rear perspective view showing how conductive gasket 88 may be mounted to antenna module 94. Rear housing wall 12R (FIG. 7) has been omitted from FIG. 10 for the sake of clarity. As shown in FIG. 10, the bottom surface of substrate 96 may be mounted to support 82. Conductive gasket 88 may be mounted to top surface 100 of substrate 96. Conductive gasket 88 may extend around the lateral periphery of substrate 96 and may laterally surround air gap 86. Conductive gasket 88 may contact grounded shielding ring 110 on substrate 96 (FIG. 9). The top surface of conductive gasket 88 may be pressed against conductive support plate 80 (FIG. 7).

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
a dielectric cover layer;
a first conductive layer on the dielectric cover layer and having an opening;
a second conductive layer extending parallel to the first conductive layer;
a first substrate mounted to the second conductive layer;
a second substrate mounted to the first substrate, the second substrate overlapping the opening and being separated from the dielectric cover layer by a gap; and
an antenna resonating element on the second substrate and configured to convey radio-frequency signals through the gap, the opening, and the dielectric cover layer.

2. The electronic device of claim 1, further comprising:
a grounded shielding ring on the second substrate and laterally surrounding the antenna resonating element, wherein the antenna resonating element extends from a segment of the grounded shielding ring;
a radio-frequency transmission line having a signal conductor that includes a signal trace on the first substrate and a signal via on the second substrate, the signal via being coupled to an antenna feed terminal on the antenna resonating element;
a screw that couples the second substrate to the second conductive layer; and
a conductive gasket that couples the second substrate to the first conductive layer, wherein the conductive gasket contacts the grounded shielding ring and the first conductive layer and laterally extends around the gap and the opening, the radio-frequency signals comprising ultra-wideband (UWB) signals.

3. The electronic device of claim 2, wherein the first conductive layer is not adhered to the dielectric cover layer.

4. The electronic device of claim 1, wherein the radio-frequency signals comprise ultra-wideband (UWB) signals.

5. The electronic device of claim 1, further comprising:
an antenna feed terminal on the antenna resonating element; and
a radio-frequency transmission line having a signal conductor coupled to the antenna feed terminal, wherein the signal conductor extends through the first substrate and the second substrate.

6. The electronic device of claim 5, wherein the signal conductor comprises a signal trace on the first substrate and a conductive via on the second substrate.

7. The electronic device of claim 6, further comprising:
ground traces on the first substrate; and
a conductive interconnect structure that extends through the first substrate and that couples the ground traces to the second conductive layer.

8. The electronic device of claim 1, further comprising:
a conductive gasket that couples the second substrate to the first conductive layer, the conductive gasket laterally extending around the gap.

9. The electronic device of claim 8, further comprising:
a ring of conductive traces on the second substrate and laterally surrounding the antenna resonating element, wherein the antenna resonating element comprises a conductive patch extending from a segment of the ring of conductive traces.

10. The electronic device of claim 9, wherein the conductive gasket overlaps the ring of conductive traces.

11. The electronic device of claim 1, further comprising:
a housing having sidewalls and a rear wall mounted to the sidewalls, wherein the rear wall comprises the dielectric cover layer and the first conductive layer; and
a display mounted to the sidewalls opposite the rear wall.

12. The electronic device of claim 11, wherein the dielectric cover layer comprises glass, the first conductive layer comprises a metal plate, and the second conductive layer comprises a conductive chassis of the housing that is interposed between the display and the rear wall.

13. The electronic device of claim 1, further comprising:
a conductive ring on a surface of the second substrate, wherein the antenna resonating element comprises a conductive trace on the surface of the second substrate and extending from a first segment of the conductive ring.

14. The electronic device of claim 13, wherein the conductive ring comprises a second segment, a third segment, and a fourth segment, the second segment extends parallel to the first segment, the third segment couples a first end of the first segment to a first end of the second segment, the fourth segment couples a second end of the first segment to a second end of the second segment, and the fourth segment extends parallel to the third segment.

15. The electronic device of claim 14, wherein the antenna resonating element comprises a conductive arm that is coupled to the first segment and that is separated from the second, third, and fourth segments at the surface of the second substrate by a dielectric gap.

16. The electronic device of claim 13, further comprising:
a conductive gasket mounted to the conductive ring, wherein the conductive gasket couples the conductive ring to the first conductive layer and laterally surrounds the gap.

17. The electronic device of claim 16, wherein the gap comprises air and the conductive gasket completely surrounds the opening.

18. The electronic device of claim 16, further comprising:
a ground layer on the first substrate;
first fences of conductive vias extending through the first substrate; and
second fences conductive vias extending through the second substrate, wherein the first and second fences of conductive vias couple the ground layer to the conductive ring through the first and second substrates.

19. The electronic device of claim 18, wherein the first substrate comprises a flexible printed circuit and the second substrate is soldered to the flexible printed circuit.

20. The electronic device of claim 16, wherein the conductive gasket comprises conductive foam.

* * * * *